L. Evans,
Wringer
Nº 39,039.   Patented June 30, 1863.
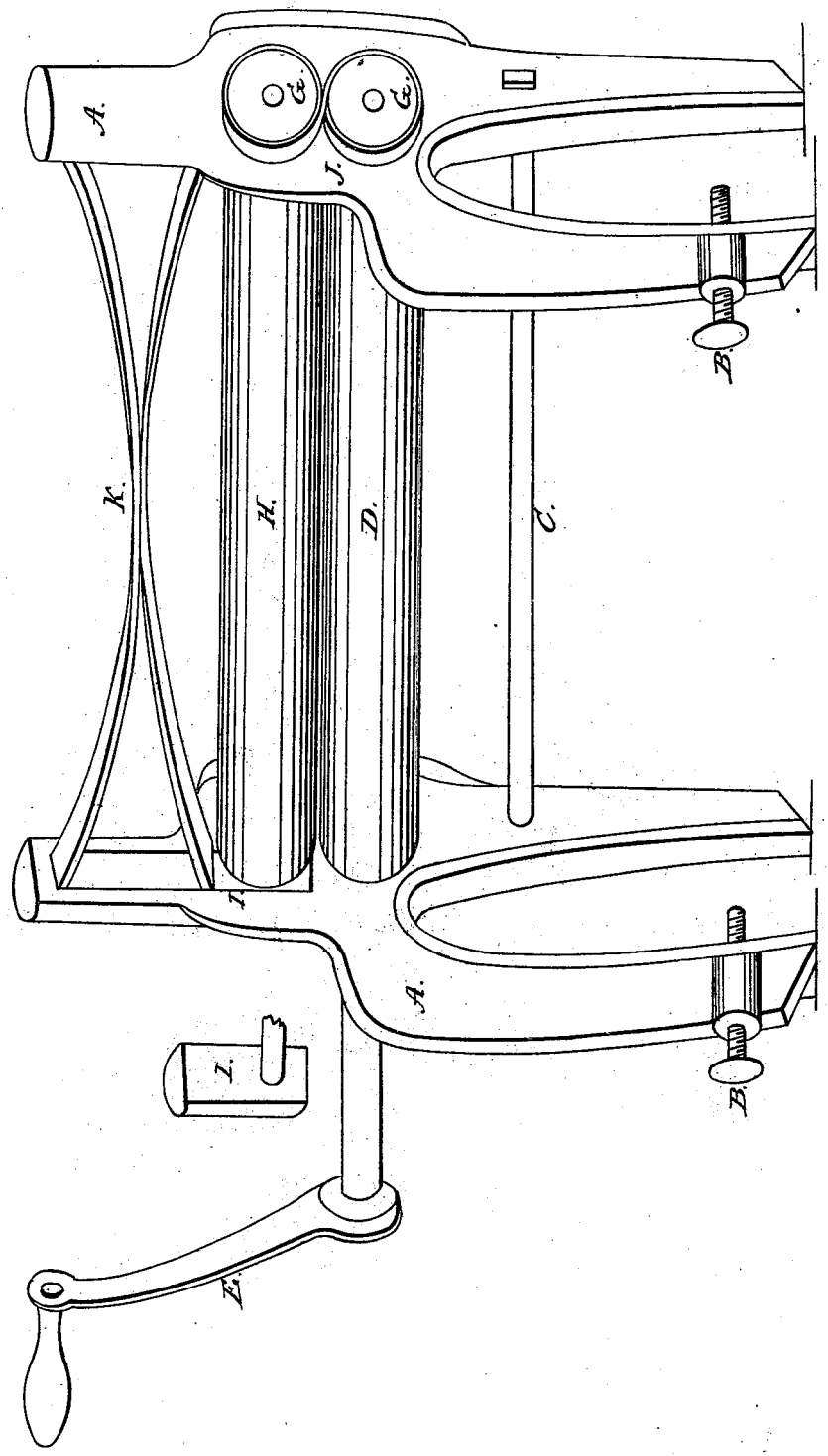

UNITED STATES PATENT OFFICE.

LUCIUS EVANS, OF FAYETTEVILLE, NEW YORK.

IMPROVED WRINGING-MACHINE.

Specification forming part of Letters Patent No. 39,039, dated June 30, 1863.

*To all whom it may concern:*

Be it known that I, LUCIUS EVANS, of Fayetteville, in the county of Onondaga and State of New York, have invented new and useful Improvements in Clothes-Wringers; and I do hereby declare that the following is a full and exact description thereof, reference being had to the accompanying drawings, and to the letters of reference marked thereon, making a part of this specification.

The nature of my invention consists in having two pulleys, one on each axle of the rollers, with a cross-band, and their arrangement and combination with the elastic rollers, elliptic springs, and sliding boxes.

To enable others skilled in the art to make and use my invention, I will proceed to describe its construction and operation.

A represents the ordinary frame, which is made of iron, having two set-screws, B, to fasten the frame to the sides of a tub.

C is a coupling-rod, to brace and strengthen the frame A.

D is an elastic or india-rubber roller, having a crank, E, at one end, and a pulley, G, at the other end.

H is the upper elastic roller, which, as usual, works independently in a sliding box, I, in each side of frame A, and has likewise a pulley, G, at its one end, connected with the lower pulley by a band, J.

K represents elliptic springs, located near the top of frame, resting upon the sliding boxes I, to press the rollers together as the clothes are passing between the rollers.

When the machine is put in operation by the crank E, the roller D operates the roller H, the elliptic springs press the rollers together, but the rollers often slip and will not revolve, and twist loose from their axle, preventing the operation of the machine and the clothes from passing between the rollers. To avoid these difficulties I attach the band-pulleys G to the ends of the axle of each roller, outside of the frame A, and fasten an elastic or rubber band J around them, the band crossing between the peripheries of the pulleys to regulate and assist in revolving the rollers D and H, by giving a friction to the ends of rollers (opposite to the movement of the crank E) equal to and corresponding with the motion of the crank, which secures the regular and even revolution of the rollers.

I am aware that elliptic springs, india rubber rollers, and iron frames have been used, therefore these I do not claim; but

What I claim as my invention, and desire to secure by Letters Patent, is—

The arrangement and combination of the cross-band and pulleys with elastic rollers, when arranged and combined with the elliptic springs K and the sliding boxes I, as herein described, and for the purposes set forth.

In testimony whereof I have hereunto signed my name before two subscribing witnesses.

LUCIUS EVANS.

Witnesses:
OLVIN MORGAN,
L. C. GARDNER.